US012632025B2

(12) United States Patent
Miyake et al.

(10) Patent No.: US 12,632,025 B2
(45) Date of Patent: May 19, 2026

(54) DISPLAY DEVICE, COMPUTER PROGRAM, AND STORAGE MEDIUM

(71) Applicant: FANUC CORPORATION, Yamanashi (JP)

(72) Inventors: Masahiko Miyake, Yamanashi (JP); Masashi Yasuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 434 days.

(21) Appl. No.: 18/250,973

(22) PCT Filed: Nov. 26, 2021

(86) PCT No.: PCT/JP2021/043383
§ 371 (c)(1),
(2) Date: Apr. 27, 2023

(87) PCT Pub. No.: WO2022/114124
PCT Pub. Date: Jun. 2, 2022

(65) Prior Publication Data
US 2023/0375995 A1      Nov. 23, 2023

(30) Foreign Application Priority Data
Nov. 30, 2020      (JP) ................................. 2020-198771

(51) Int. Cl.
G05B 19/4068      (2006.01)
G05B 19/042      (2006.01)
(52) U.S. Cl.
CPC ....... G05B 19/042 (2013.01); G05B 19/4068 (2013.01); *G05B 2219/35349* (2013.01)

(58) Field of Classification Search
CPC .............. G05B 19/042; G05B 19/4068; G05B 2219/35349
See application file for complete search history.

(56) References Cited

U.S. PATENT DOCUMENTS

2019/0310815 A1    10/2019  Oho
2022/0179388 A1*   6/2022  Sagasaki .............. G05B 19/182

FOREIGN PATENT DOCUMENTS

CN          106774171 A     5/2017
CN          108346182 A     7/2018
          (Continued)

OTHER PUBLICATIONS

International Search Report issued in PCT/JP2021/043383; mailed Feb. 1, 2022.
(Continued)

*Primary Examiner* — Michael W Choi
(74) *Attorney, Agent, or Firm* — Studebaker Brackett PLLC

(57)      ABSTRACT

Provided are a display device, a computer program, and a storage medium that make it possible to increase visibility of a tool path. This display device comprises: an oscillation condition setting unit that sets oscillation conditions for oscillation cutting in which a workpiece and a tool are oscillated relative to each other; a tool path information generation unit that generates tool path information related to a tool path on the basis of the oscillation conditions; a determination unit that determines an actual cut portion and an air cut portion on the tool path on the basis of the tool path information; and a display control unit that controls a display unit to display thereon the tool path in which the actual cut portion and the air cut portion on the tool path are displayed in different manners.

4 Claims, 6 Drawing Sheets

(56)             References Cited

FOREIGN PATENT DOCUMENTS

| CN | 109661621 | A | 4/2019 |
|----|-----------|---|--------|
| CN | 110398938 | A | 11/2019 |
| JP | S62-074104 | A | 4/1987 |
| JP | 2001-092513 | A | 4/2001 |
| JP | 2018-180734 | A | 11/2018 |
| JP | 6667724 | B1 | 3/2020 |

OTHER PUBLICATIONS

Li Moshen et al., "Analysis of tool axis control and tool path editing based on PowerMill", T. Technology, No. 12, pp. 74-79, Dec. 20, 2015.
Jin Xia et al., "Research on Fixed-axis Contour Milling Based on UG/CAM", Machine Tools and Hydraulics, Issue 11, pp. 53-55, Nov. 15, 2007. The English translation of the Chinese Notice of Allowance as a concise explanation of the relevance is submitted herewith.
A Notice of Allowance mailed by China National Intellectual Property Administration on Jul. 1, 2025, which corresponds to Chinese Patent Application No. 202180078628.1 and is related to U.S. Appl. No. 18/250,973; with English language translation.

* cited by examiner

FIG. 6

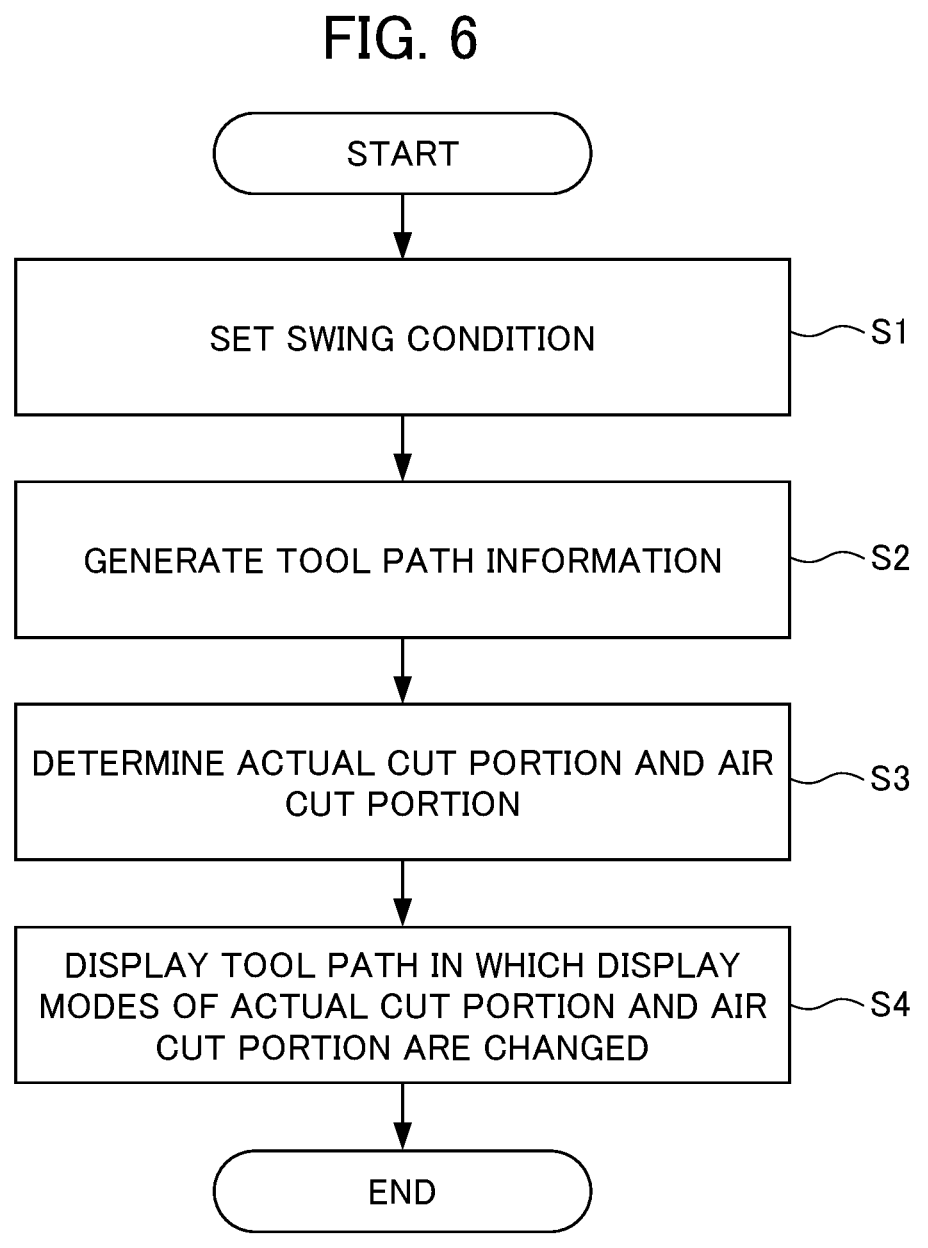

```
         ┌─────────────┐
         │    START    │
         └─────────────┘
                │
                ▼
┌──────────────────────────────────┐
│       SET SWING CONDITION        │──── S1
└──────────────────────────────────┘
                │
                ▼
┌──────────────────────────────────┐
│    GENERATE TOOL PATH INFORMATION │──── S2
└──────────────────────────────────┘
                │
                ▼
┌──────────────────────────────────┐
│  DETERMINE ACTUAL CUT PORTION AND │──── S3
│          AIR CUT PORTION          │
└──────────────────────────────────┘
                │
                ▼
┌──────────────────────────────────┐
│  DISPLAY TOOL PATH IN WHICH       │
│  DISPLAY MODES OF ACTUAL CUT      │──── S4
│  PORTION AND AIR CUT PORTION      │
│  ARE CHANGED                      │
└──────────────────────────────────┘
                │
                ▼
         ┌─────────────┐
         │     END     │
         └─────────────┘
```

DISPLAY DEVICE, COMPUTER PROGRAM, AND STORAGE MEDIUM

TECHNICAL FIELD

The present invention relates to a display device, a computer program, and a storage medium.

BACKGROUND ART

Conventionally, oscillation cutting has been known in which cutting is performed while a workpiece and a cutting tool are fed in a machining direction, and at the same time, the workpiece and the cutting tool are relatively reciprocally vibrated (for example, see Patent Document 1). A tool path drawing function has also been known which displays a tool path of a cutting tool at the time of machining on a display device.

Patent Document 1: Japanese Patent No. 6667724

DISCLOSURE OF THE INVENTION

Problems to be Solved by the Invention

In such a tool path drawing function, the tool path is displayed as one line for each rotation of the workpiece. However, the conventional tool path drawing function does not distinguish between a portion where the tool path is actually cut and a portion where the tool path is not actually cut (air cut portion). For this reason, in the conventional tool path drawing function, in particular, when the oscillation frequency, amplitude, or the like in the oscillation condition becomes large, it is difficult to distinguish between the actual cut portion and the air cut portion, and the visibility of the tool path decreases. Therefore, it is required to improve the visibility of the tool path.

Means for Solving the Problems

A display device according to an embodiment of the present disclosure includes: a oscillation condition setting unit that sets a oscillation condition for performing oscillation cutting which relatively vibrates a workpiece and a tool; a tool path information generation unit that generates tool path information on a tool path based on the oscillation condition; a determination unit that determines an actual cut portion and an air cut portion in the tool path based on the tool path information; and a display control unit that controls a display unit to display the tool path in which display modes of the actual cut portion and the air cut portion in the tool path are changed.

A computer program according to an embodiment of the present disclosure causes a computer to execute: a step of setting a oscillation condition for performing a oscillation cutting process which relatively vibrates a workpiece and a tool; a step of generating tool path information on a tool path based on the oscillation condition; a step of determining an actual cut portion and an air cut portion in the tool path based on the tool path information; and a step of controlling a display unit to display the tool path in which display modes of the actual cut portion and the air cut portion in the tool path are changed.

A storage medium according to an embodiment of the present disclosure stores a computer program for causing a computer to execute: a step of setting a oscillation condition for performing a oscillation cutting process which relatively vibrates a workpiece and a tool; a step of generating tool path information on a tool path based on the oscillation condition; a step of determining an actual cut portion and an air cut portion in the tool path based on the tool path information; and a step of controlling a display unit to display the tool path in which display modes of the actual cut portion and the air cut portion in the tool path are changed.

Effects of the Invention

According to one aspect of the present disclosure, it is possible to improve the visibility of the tool path.

BRIEF DESCRIPTION OF THE DRAWINGS

FIG. 6 is a flowchart showing a flow of processing of the display device according to the present embodiment.

PREFERRED MODE FOR CARRYING OUT THE INVENTION

Figure 1:
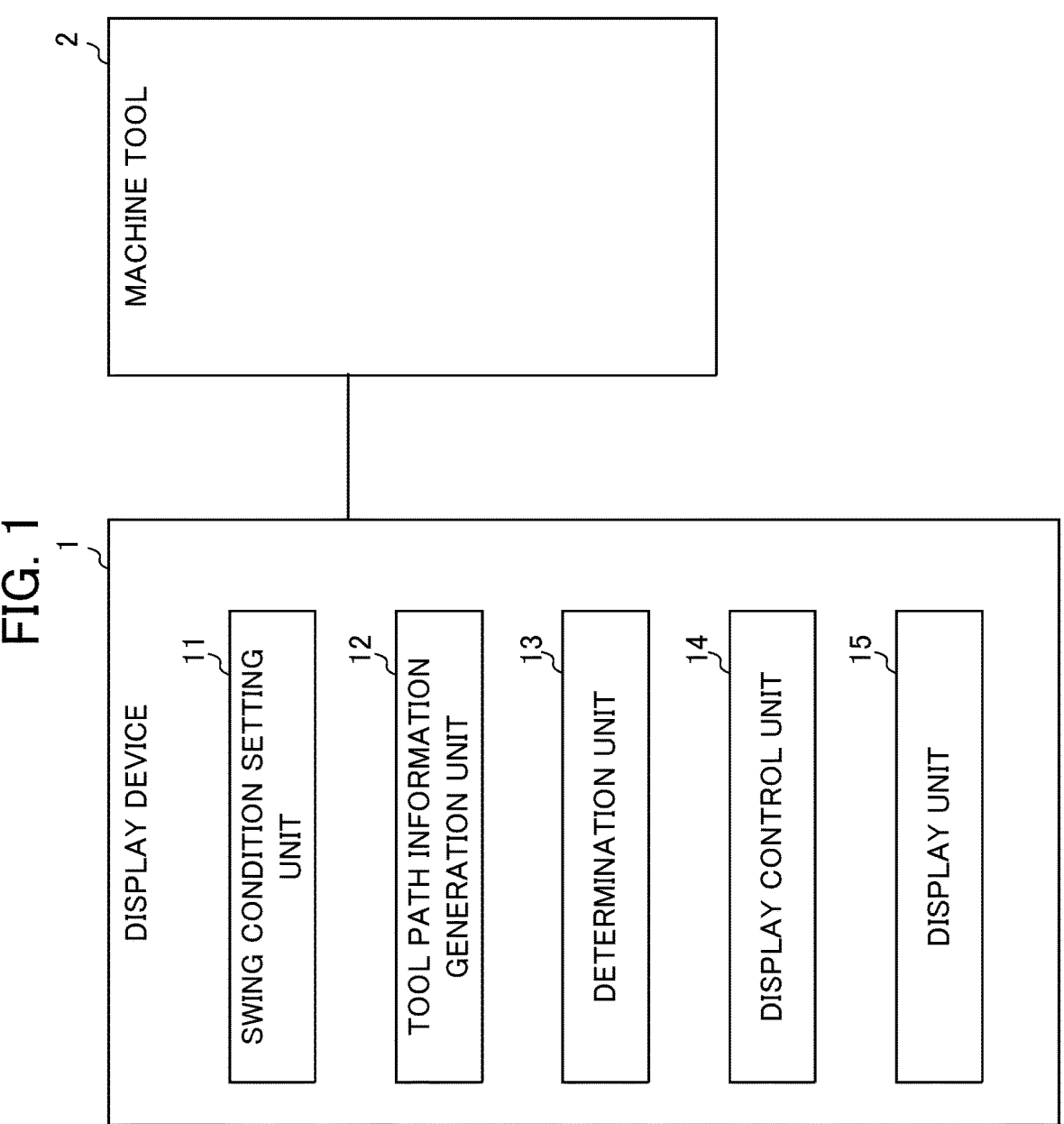
FIG. 1 is a diagram showing an outline of a display device according to an embodiment of the present invention.

Hereinafter, an example of an embodiment of the present invention will be described. FIG. 1 is a diagram showing an outline of a display device 1 according to the present embodiment. For example, as shown in FIG. 1, the display device 1 may be a numerical control device connected to the machine tool 2, or may be a computer device having a servo guide and connected to the numerical control device.

The machine tool 2 is, for example, an apparatus for performing a oscillation cutting process on a workpiece, and is directly or indirectly connected to the display device 1. The machine tool 2 includes a general configuration for performing a oscillation cutting process of tools, a spindle, feed shafts, and the like.

The display device 1 includes a oscillation condition setting unit 11, a tool path information generation unit 12, a determination unit 13, a display control unit 14, and a display unit 15.

The oscillation condition setting unit 11 sets a oscillation condition (for example, a spindle rotation speed, a spindle feed amount, a oscillation frequency, a oscillation amplitude, and the like) for performing oscillation cutting for relatively vibrating the workpiece and the tool based on a machining program, a machining condition, and the like.

The tool path information generation unit 12 generates tool path information on the tool path based on the oscillation condition. The tool path information generation unit 12 generates tool path information from, for example, a simulation of a command value of a machining program. The tool path information generation unit 12 may operate the machine tool 2 to generate tool path information from feedback from the machine tool 2. Here, the tool path information includes information for displaying tool paths such as a spindle angle, feed shaft positions, and feed amounts per rotation on the display unit 15.

The determination unit 13 determines the actual cut portion and the air cut portion in the tool path based on the tool path information generated by the tool path information generating unit 12. The conditions for determining the actual cut portion and the air cut portion by the determination unit 13 will be described later.

The display control unit 14 controls the display unit 15 to display the tool path in which the display modes of the actual cut portion and the air cut portion in the tool path are changed based on the tool path information in which the determination unit 13 determines the actual cut portion and the air cut portion.

The display unit 15 is, for example, a liquid crystal display, an organic EL display, or the like. Under the control of the display control unit 14, the display unit 15 displays information on the tool path and the like as described above.

Figure 2:
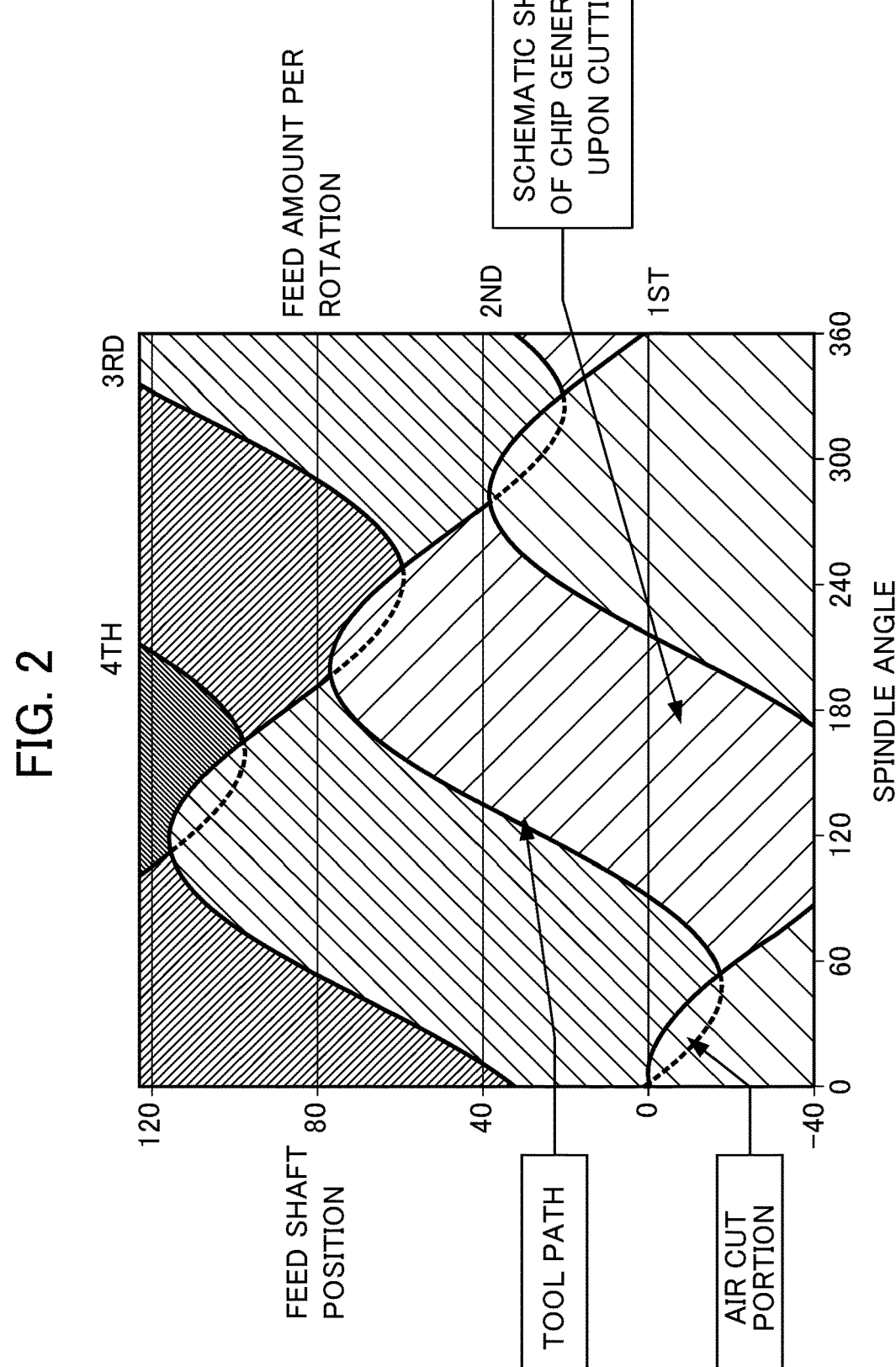
FIG. 2 is a diagram showing a specific example of tool paths displayed on a display device according to the present embodiment.

FIG. 2 is a diagram showing a specific example of tool paths displayed on the display device 1 according to the present embodiment. The tool paths shown in FIG. 2 is constituted by a plurality of sine waves. In FIG. 2, the vertical axis represents the position of the feed shaft, and the horizontal axis represents the spindle angle. In the example shown in FIG. 2, the display device 1 displays tool paths in the first, second, third, and fourth oscillation cutting processes.

As described above, the determination unit 13 determines the actual cut portion and the air cut portion in the tool path based on the tool path information. Specifically, based on the tool path information, the determination unit 13 determines a portion where one tool path and the next tool path overlap each other as an air cut portion, and determines a portion where one tool path and another tool path do not overlap each other as an actual cut portion.

For example, the determination unit 13 determines a portion where the first tool path and the second tool path overlap each other as an air cut portion, and determines a portion where the first tool path and the second tool path do not overlap each other as an actual cut portion.

Similarly, the determination unit 13 determines a portion where the second tool path and the third tool path overlap each other as an air cut portion, and determines a portion where the second tool path and the third tool path do not overlap each other as an actual cut portion.

Similarly, the determination unit 13 determines a portion where the third tool path and the fourth tool path overlap each other as an air cut portion, and determines a portion where the third tool path and the fourth tool path do not overlap each other as an actual cut portion.

The display control unit 14 controls the display unit 15 to display the tool path in which the display modes of the actual cut portion and the air cut portion in the tool path are changed. Specifically, the display control unit 14 controls the display unit 15 to display the actual cut portion of the tool path and not to display the air cut portion of the tool path.

Furthermore, an area surrounded by the actual cut portion and the intersections of the actual cutting portion in the tool path indicates a schematic shape of the chip of the workpiece generated by the oscillation cutting process. Accordingly, the display control unit 14 changes the display mode of the range surrounded by the actual cut portion and the intersections of the actual cutting portion in the tool path, thereby displaying the schematic shape of the chip of the workpiece generated by the oscillation cutting process.

Specifically, the display control unit 14 fills the range surrounded by the actual cut portion and the intersections of the actual cutting portion in the tool path with different colors, thereby displaying the schematic shape of the chip of the workpiece generated by the oscillation cutting process.

More specifically, the display control unit 14 fills the area surrounded by the actual cut portion in the first tool path and the intersections of the actual cut portion in the first tool path and the vertical axis and the horizontal axis with blue. Similarly, the display control unit 14 fills the area surrounded by the actual cut portions in the first and second tool paths and the intersections of the actual cut portions in the first and second tool paths with red.

Similarly, the display control unit 14 fills the area surrounded by the actual cut portions in the second and third tool paths and the intersections of the actual cut portions in the second and third tool paths with green. Similarly, the display control unit 14 fills the area surrounded by the actual cut portions in the third and fourth tool paths and the intersections of the actual cut portions in the third and fourth tool paths with light blue.

Furthermore, the display control unit 14 changes colors of the plurality of tool paths to colors with which the tool paths and the schematic shapes of chips generated by the tool paths are associated with each other. Specifically, the display control unit 14 changes the colors of the plurality of tool paths, and changes the colors of the tool paths and the schematic shapes of the chips generated by the tool paths to the same or similar colors.

More specifically, the display control unit 14 changes the color of the first tool path to blue, changes the color of the second tool path to red, changes the color of the third tool path in the oscillation cutting process to green, and changes the color of the fourth tool path in the oscillation cutting process to light blue.

Furthermore, the display control unit 14 changes the colors of the tool path and the schematic shape of the chip to colors of the same or similar color. Specifically, the display control unit 14 changes the color of the schematic shape of the chip generated by the first tool path to blue, changes the color of the schematic shape of the chip generated by the second tool path in the oscillation cutting process to red, changes the color of the schematic shape of the chip generated by the third tool path in the oscillation cutting process to green, and changes the color of the schematic shape of the chip generated by the fourth tool path in the oscillation cutting process to light blue.

In the above-described example, the display control unit 14 controls the display unit 15 to display the actual cut portion of the tool path and not to display the air cut portion of the tool path. However, in the present invention, the display mode of the actual cut portion and the air cut portion may be changed to another mode.

For example, the display control unit 14 may control the actual cut portion and the air cut portion of the tool paths to be displayed in different colors. Furthermore, the display control unit 14 may control to display the actual cut portion of the tool path with a solid line and the air cut portion with a dotted line. Moreover, in order to highlight the location where the air cut portion is generated, the display control unit 14 may add a specific mark thereto on the display. For example, the display control unit 14 may control to add an arrow to the path of the air cut portion or surrounding the path of the air cut portion by a circle.

Furthermore, in the above-described example, the display control unit 14 displays the schematic shape of the chip of the workpiece generated by the oscillation cutting process by filling the area surrounded by the actual cut portion and the intersections of the actual cutting portion in the tool path with different colors. However, for example, the display control unit 14 may highlight the area surrounded by the actual cut portion and the intersections of the actual cut portion with a frame line.

Moreover, in the above-described example, the display control unit 14 changes the colors of the plurality of tool paths, and changes the colors of the tool paths and the schematic shapes of the chips generated by the tool paths to the colors of the same or similar color. However, the tool paths and the schematic shapes of the chips generated by the tool paths may be given hatching having the same pattern.

Figure 3:
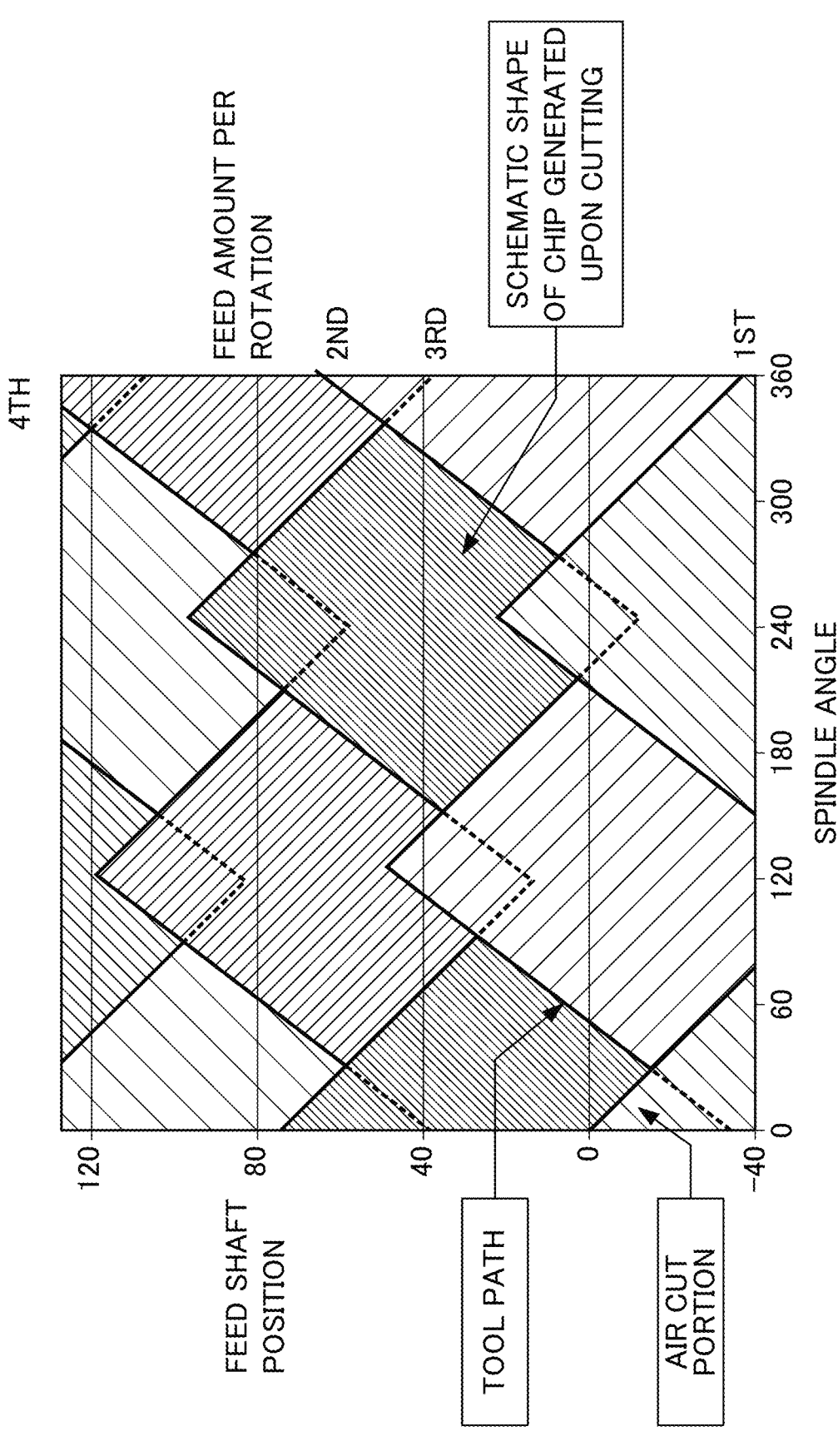
FIG. 3 is a diagram showing another specific example of tool paths displayed on the display device according to the present embodiment.

FIG. 3 is a diagram showing another specific example of the tool paths displayed on the display device 1 according to the present embodiment. The tool paths shown in FIG. 3 include a plurality of triangular waves. Also in the example of FIG. 3, similarly to FIG. 4, the determination unit 13 determines the actual cut portion and the air cut portion in the tool paths based on the tool path information.

Furthermore, the display control unit 14 changes the display mode of the area surrounded by the actual cut portion and the intersection of the actual cutting portion in the tool path, thereby displaying the schematic shape of the chip of the workpiece generated by the oscillation cutting process.

Furthermore, the display control unit 14 changes colors of the plurality of tool paths to colors with which the tool paths and the schematic shapes of chips generated by the tool paths are associated with each other.

As described above, even when the tool paths include a plurality of triangular waves, it is possible for the display device 1 to control the display unit 15 to display the tool path in which the display modes of the actual cut portion and the air cut portion in the tool path are changed.

Figure 4:
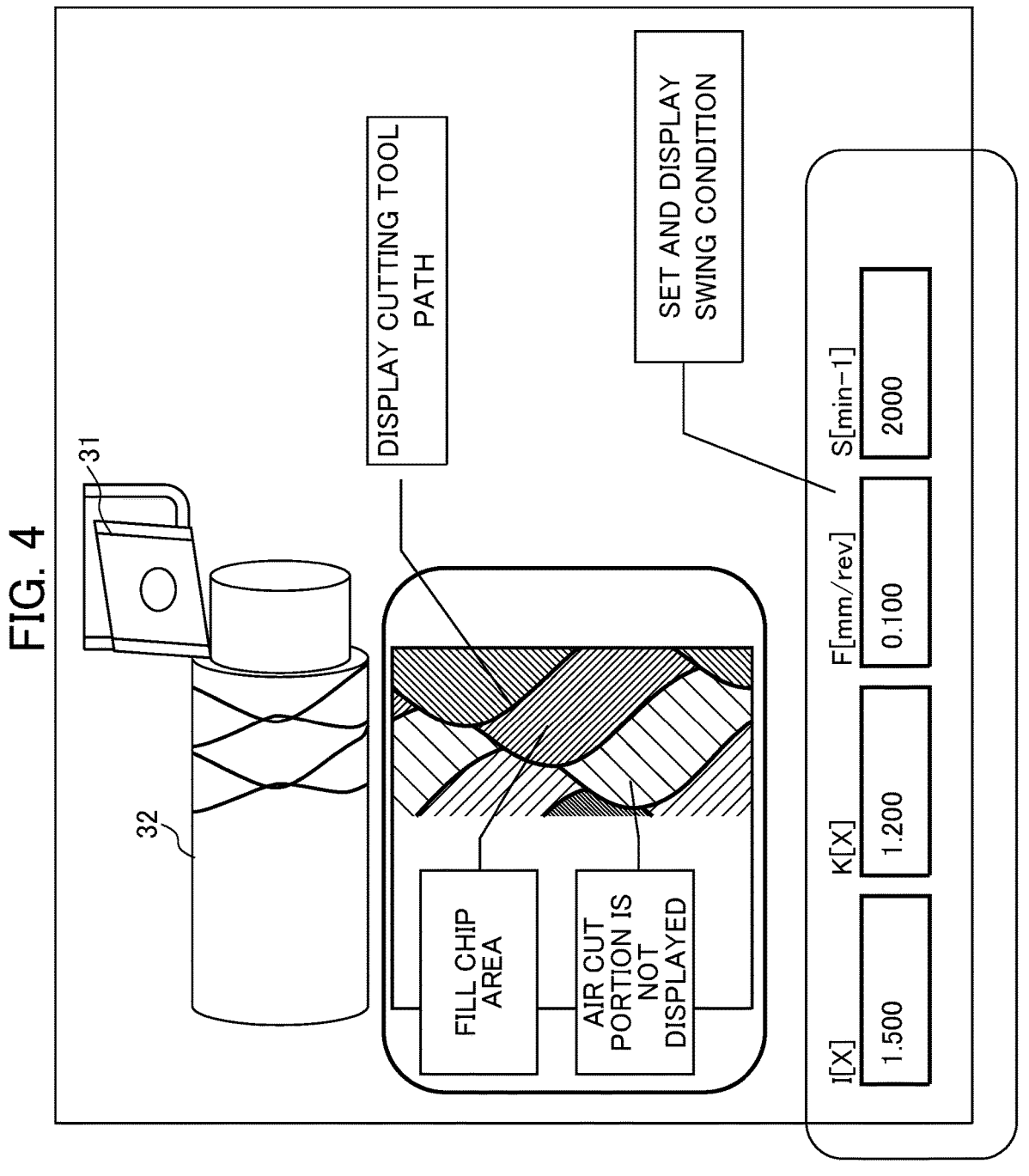
FIG. 4 is a diagram showing a display example displayed on the display device according to the present embodiment.
Figure 5:
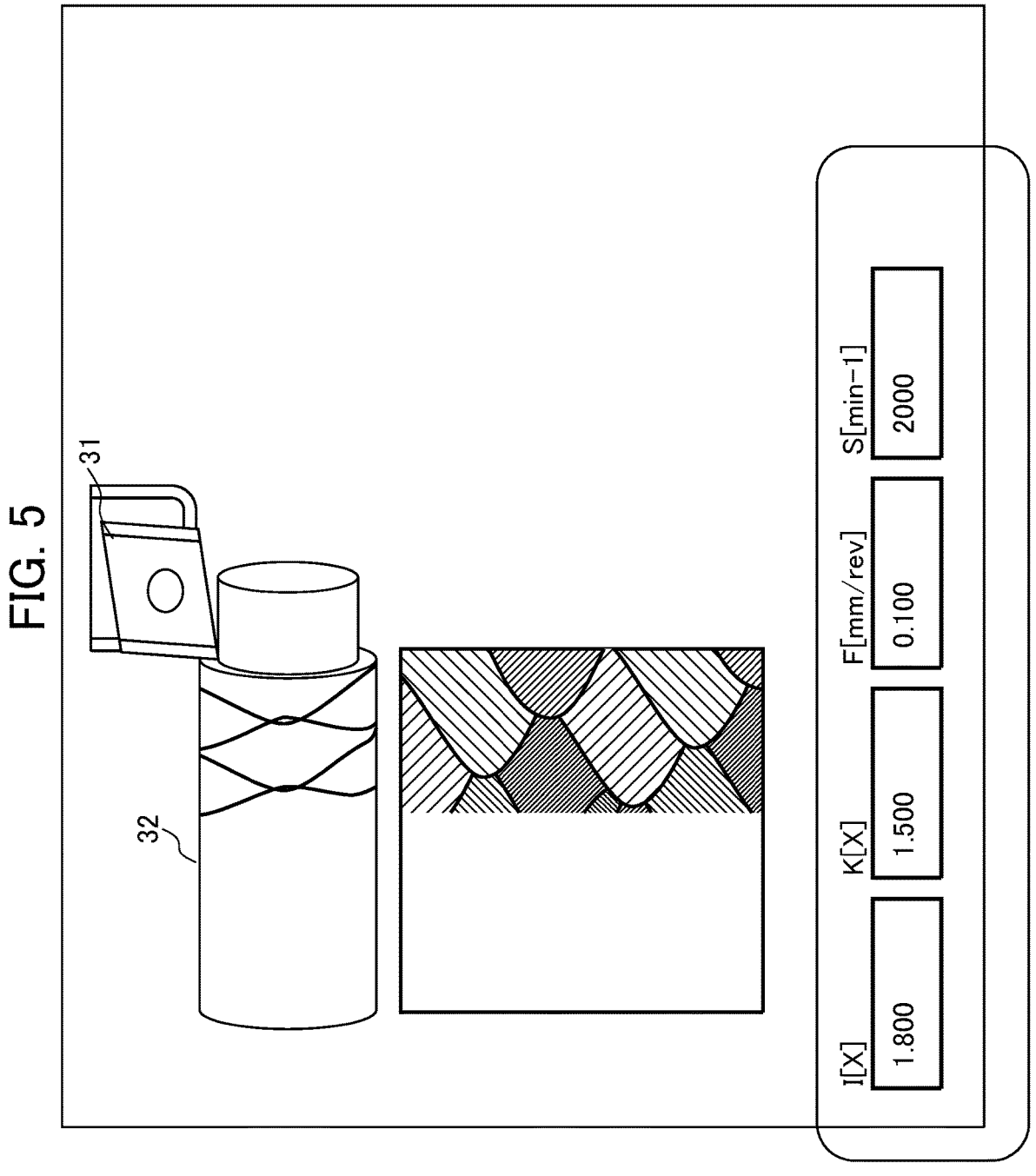
FIG. 5 is a diagram showing a display example displayed on the display device according to the present embodiment.

FIGS. 4 and 5 each show a display example displayed on the display device 1 according to the present embodiment. As shown in FIGS. 4 and 5, the display device 1 displays the tool path of the oscillation cutting and displays the setting of the oscillation condition on the display unit 15.

Here, with respect to the tool path of the oscillation cutting, the display device 1 does not display the air cut portion, and controls so that the area representing the schematic shape of the chip is filled with a predetermined color. Furthermore, the setting of the oscillation condition includes I (the number of vibrations per spindle rotation), K (the vibration amplitude ratio with respect to the feed amount per spindle rotation), F (the feed amount per spindle rotation) (mm/rev), and S (the number of spindle rotations per minute) ($min^{-1}$).

Furthermore, the display device 1 displays a model 31 of the oscillation cutting tool and a model 32 of the workpiece to be oscillation cut by the tool on the display unit 15.

In FIG. 4, when the oscillation condition is changed, the display device 1 performs reproduction of the tool path information, determination of the actual cut portion and the air cut portion, and the like. Then, as shown in FIG. 5, the display device 1 displays again the actual cut portion of the tool path. At the same time, the display device 1 updates the display of the schematic shape of the chip of the workpiece generated by the oscillation cutting process.

FIG. 6 is a flowchart showing the flow of processing of the display device 1 according to the present embodiment. In step S1, the oscillation condition setting unit 11 sets a oscillation condition for performing oscillation cutting which relatively vibrates the workpiece and the tool. In step S2, the tool path information generation unit 12 generates tool path information on the tool path based on the oscillation condition.

In step S3, the determination unit 13 determines the actual cut portion and the air cut portion in the tool path based on the tool path information generated by the tool path information generation unit 12. In step S4, the display control unit 14 controls the display unit 15 to display the tool path in which the display modes of the actual cut portion and the air cut portion in the tool path are changed based on the tool path information in which the determination unit 13 determines the actual cut portion and the air cut portion.

As described above, the display device 1 according to the present embodiment includes the oscillation condition setting unit 11 that sets a oscillation condition for performing oscillation cutting for relatively vibrating a workpiece and a tool, the tool path information generation unit 12 that generates tool path information on a tool path based on the oscillation condition, the determination unit 13 that determines an actual cut portion and an air cut portion in the tool path based on the tool path information, and the display control unit 14 that controls the display unit 15 to display the tool path in which display modes of the actual cut portion and the air cut portion in the tool path are changed.

With such a configuration, it is possible for the display device 1 to perform displaying by differentiating between the actual cut portion and the air cut portion in the tool path. Therefore, it is possible for a user using the display device 1 to visually recognize whether or not air cutting occurs in the tool path, the ratio between actual cutting and air cutting, and the like.

Furthermore, the display control unit 14 changes a display mode of an area surrounded by the actual cut portion and an intersection of the actual cut portion in the tool path, thereby displaying a schematic shape of a chip of the workpiece generated by a oscillation cutting process. With such a configuration, it is possible for the user using the display device 1 to confirm the schematic shape of the chip of the workpiece generated by the oscillation cutting process.

Furthermore, the display control unit 14 changes colors of the plurality of tool paths to colors with which the tool paths and the schematic shapes of chips generated by the tool paths are associated with each other. With such a configuration, it is possible for the user using the display device 1 to confirm which chips are generated in which tool path.

Although embodiments of the present invention have been described above, the display device 1 can be implemented by hardware, software, or a combination thereof. Furthermore, the control method performed by the display device 1 can also be implemented by hardware, software, or a combination thereof. Here, "implemented by software" indicates being realized by a computer reading and executing a program.

The program may be stored in various types of non-transitory computer-readable media (non-transitory computer-readable media) and provided to a computer. Non-transitory computer-readable media include various types of tangible storage media. Examples of non-transitory computer-readable media include magnetic recording media (e.g., hard disk drives), magneto-optical recording media (e.g., magneto-optical disks), CD-ROMs (Read Only Memory), CD-Rs, CD-R/Ws, and semiconductor memory (For example, mask ROM, PROM (Programmable ROM), EPROM (Erasable PROM), flash ROM, and RAM (random access memory)).

Although the above-described embodiments are preferred embodiments of the present invention, the scope of the present invention is not limited to the above-described embodiments. Various modifications can be made without departing from the gist of the present invention.

EXPLANATION OF REFERENCE NUMERALS

1 Display device
11 Oscillation condition setting unit
12 Tool path information generation unit
13 Determination unit
14 Display control unit
15 Display unit
The invention claimed is:
1. A display device comprising:
a processor,
wherein the processor is configured to:
    set an oscillation condition for performing oscillation cutting which relatively vibrates a workpiece and a tool;
    generate tool path information on a tool path based on the oscillation condition;
    determine an actual cut portion and an air cut portion in the tool path based on the tool path information; and
    control a display unit to display the actual cut portion and the air cut portion of the tool path in different colors or in different line types.
2. The display device according to claim 1, wherein the processor changes a display mode of an area surrounded by the actual cut portion and an intersection of the actual cut portion in the tool path, thereby displaying a schematic shape of a chip of the workpiece generated by an oscillation cutting process.
3. The display device according to claim 2, wherein the processor changes colors of the actual cut portion of the tool path and the air cut portion of the tool path to colors with which the actual cut portion of the tool path and the air cut portion of the tool path and schematic shapes of chips generated by the actual cut portion of the tool path and the air cut portion of the tool path are associated with each other.
4. A non-transitory storage medium that stores a computer program for causing a computer to execute:
    a step of setting an oscillation condition for performing an oscillation cutting process which relatively vibrates a workpiece and a tool;
    a step of generating tool path information on a tool path based on the oscillation condition;
    a step of determining an actual cut portion and an air cut portion in the tool path based on the tool path information; and
    a step of controlling a display unit to display the actual cut portion and the air cut portion of the tool path in different colors or in different line types.

* * * * *